United States Patent
Salter et al.

(10) Patent No.: US 11,780,356 B1
(45) Date of Patent: Oct. 10, 2023

(54) VEHICLE HAVING MOVABLE ASSIST HANDLE WITH LIGHT DEVICE

(71) Applicant: Ford Global Technologies, LLC, Dearborn, MI (US)

(72) Inventors: Stuart C. Salter, White Lake, MI (US); David Brian Glickman, Southfield, MI (US); Ryan Kosior, South Lyon, MI (US); Lucretia Williams, Bloomfield Hills, MI (US); Annette Lynn Huebner, Highland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/854,558

(22) Filed: Jun. 30, 2022

(51) Int. Cl.
*B60N 3/02* (2006.01)
*B60Q 3/267* (2017.01)

(52) U.S. Cl.
CPC ............ *B60N 3/023* (2013.01); *B60Q 3/267* (2017.02)

(58) Field of Classification Search
CPC ................................. B60N 3/023; B60Q 3/267
USPC ......................................................... 296/1.02
See application file for complete search history.

(56) References Cited

U.S. PATENT DOCUMENTS

| | | | | |
|---|---|---|---|---|
| 6,431,643 B2* | 8/2002 | Grey | ...................... | B60N 3/023 296/214 |
| 6,793,385 B2* | 9/2004 | Tiesler | ................... | B60N 3/026 362/399 |
| 6,974,134 B1 | 12/2005 | Macri et al. | | |
| 7,905,530 B2 | 3/2011 | Browne et al. | | |
| 8,690,402 B2 | 4/2014 | Durkin et al. | | |
| 9,340,152 B2* | 5/2016 | Salter | ...................... | B60Q 3/217 |
| 10,633,895 B1 | 4/2020 | Salter et al. | | |
| 10,793,064 B2* | 10/2020 | Troeger | ................. | B60N 3/023 |
| 11,351,901 B1* | 6/2022 | Kozu | ..................... | B60N 3/023 |
| 2006/0104072 A1* | 5/2006 | Chen | ..................... | B60Q 3/267 362/490 |
| 2010/0321946 A1 | 12/2010 | Dingman et al. | | |
| 2012/0314438 A1* | 12/2012 | Gutt | ....................... | B60Q 3/267 362/545 |
| 2015/0138800 A1* | 5/2015 | Salter | .................... | B60Q 3/217 362/510 |

(Continued)

FOREIGN PATENT DOCUMENTS

| | | | | |
|---|---|---|---|---|
| JP | 2017007503 A | * | 1/2017 | |
| JP | 6413947 B2 | | 10/2018 | |

OTHER PUBLICATIONS

Machine Translation of JP2017007503A, Printed from the JPO website, Jun. 17, 2023.*

*Primary Examiner* — Jason S Morrow
(74) *Attorney, Agent, or Firm* — Vichit Chea; Price Heneveld LLP

(57) ABSTRACT

A vehicle includes a body defining a door opening, a door movable between a closed position closing the door opening in an open position exposing the door opening, and a support structure located proximate to the door opening. The vehicle also includes a deployable assist handle having a handle body configured to be gripped by a user, the handle body being deployable amongst a plurality of positions including at least a first position and a second position, the assist handle comprising a lighting device, wherein the lighting device provides an illumination beam directed to a first region when the handle is in a first position and directed to a second region when the handle is in the second position.

18 Claims, 6 Drawing Sheets

(56) References Cited

U.S. PATENT DOCUMENTS

2023/0022503 A1* 1/2023 Spencer ................ B60N 3/026

* cited by examiner

US 11,780,356 B1

VEHICLE HAVING MOVABLE ASSIST HANDLE WITH LIGHT DEVICE

FIELD OF THE DISCLOSURE

The present disclosure generally relates to vehicle assist handles, and more particularly relates to a vehicle having a deployable assist handle for ease of ingress and egress.

BACKGROUND OF THE DISCLOSURE

Automotive vehicles are commonly equipped with handle structures referred to as passenger assist handles for passengers to grasp with their hand when entering and exiting the vehicle. Assist handles are commonly fixed to a support structure in the vehicle. Some assist handles may pivot between stowed and use positions. It may be desirable to provide for an assist handle that may be deployed to different positions.

SUMMARY OF THE DISCLOSURE

According to a first aspect of the present disclosure, a vehicle is provided including a body defining a door opening, a door movable between a closed position closing the door opening in an open position exposing the door opening, and a support structure located proximate to the door opening. The vehicle also includes a deployable assist handle having a handle body configured to be gripped by a user, the handle body being deployable amongst a plurality of positions including at least a first position which is engageable by a user and a second position which is engageable by the user, the assist handle comprising a lighting device, wherein the lighting device provides an illumination beam directed to a first region when the handle body is in the first position and directed to a second region when the handle body is in the second position.

Embodiments of the first aspect of the present disclosure can include any one or a combination of the following features:
 the assist handle is located proximate to a roof of the vehicle proximate to the door opening;
 the assist handle is located in a headliner coupled to the roof;
 the illumination beam projects light to the first region proximate to the headliner;
 the illumination beam projects light downward to the second region;
 the assist handle is located in a pillar proximate to the door opening;
 the handle body in the first position is located within an interior of the vehicle and the illumination beam in the first region provides an interior light, and wherein the handle body is movable to the second position proximate to an exterior of the vehicle and the illumination beam in the second region direction provides an exterior light;
 the assist handle further comprises an actuator for actuating the handle between the first position and the second position;
 the vehicle further comprises a sensor for sensing the door positioned in the open position or closed position, wherein the handle is actuated to a use position when the door is sensed in the open position;
 the handle body is coupled to the support structure via a support arm that rotates;
 the handle body is at least partially illuminated;
 the handle body comprises a light pipe operatively coupled to the lighting device; and
 the handle body is coupled to the support structure via s support arm that rotates.

According to a second aspect of the present disclosure, a vehicle is provided and includes a body defining a door opening, a door movable between a closed position closing the door opening in an open position exposing the door opening, and a support structure located in a pillar or headliner proximate to the door opening. The vehicle also includes a deployable assist handle having a handle body that rotates relative to the support structure and is configured to be gripped by a user, the handle body being deployable amongst a plurality of positions including at least a first position which is engageable by a user and a second position which is engageable by the user, the assist handle comprising a lighting device, wherein the lighting device provides an illumination beam directed to a first region when the handle is in the first position and to a second region when the handle is in the second position.

Embodiments of the second aspect of the present disclosure can include any one or a combination of the following features:
 the handle body in the first position is located within an interior of the vehicle and the illumination beam in the first region provides an interior light, and wherein the handle body is movable to the second position proximate to an exterior of the vehicle and the illumination beam in the second region direction provides an exterior light;
 the assist handle further comprises an actuator for actuating the handle between the first position and second position;
 the vehicle further comprises a sensor for sensing the door positioned in the open position or closed position, wherein the handle is actuated when the door is sensed in the open position;
 the handle body is coupled to the support structure via a support arm that rotates;
 the handle body is at least partially illuminated; and
 the handle body comprises a light pipe operatively coupled to the lighting device.

These and other features, advantages, and objects of the present invention will be further understood and appreciated by those skilled in the art by reference to the following specification, claims, and appended drawings.

DETAILED DESCRIPTION OF PREFERRED EMBODIMENTS

Figure 1:
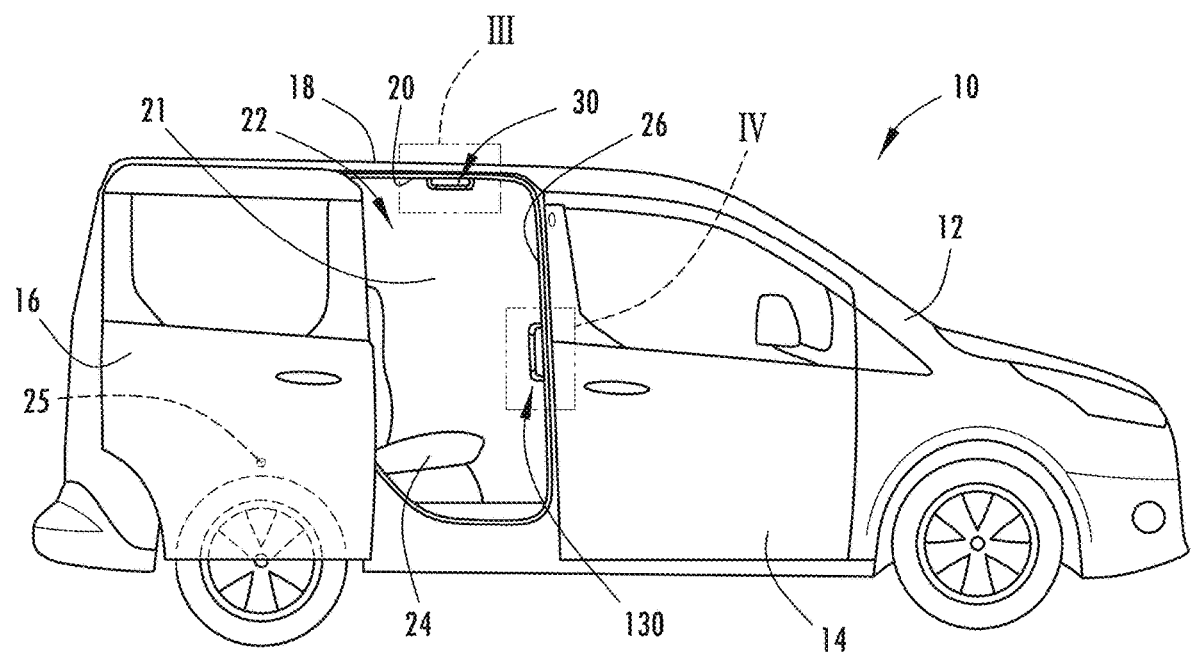
FIG. 1 is a side view of a motor vehicle equipped with deployable assist handles proximate to a side door opening of the vehicle, according to one exemplary arrangement.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having a deployable assist handle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
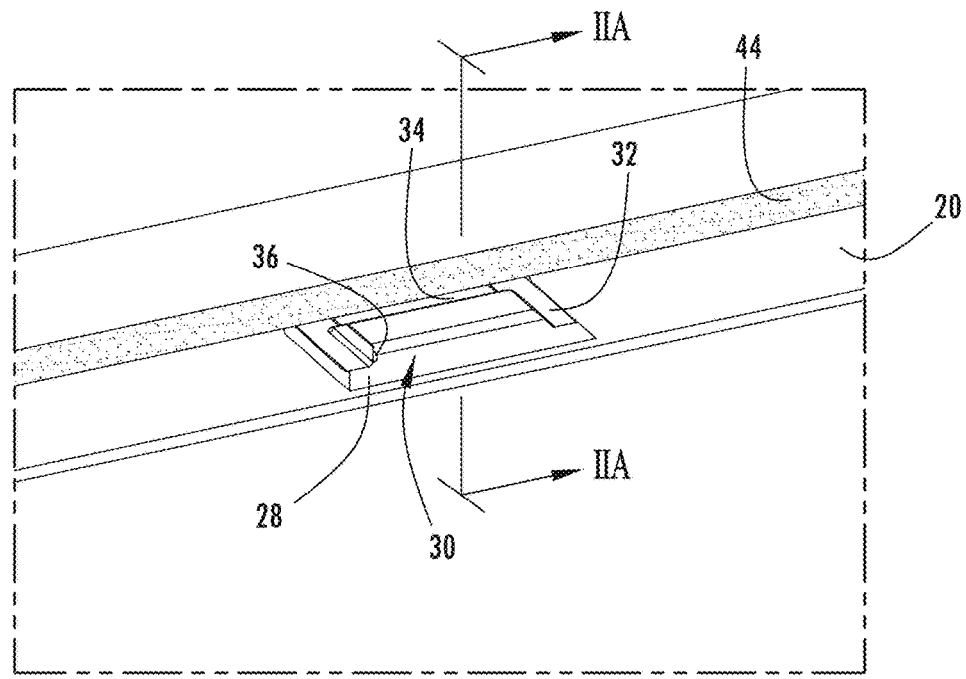
FIG. 2 is an enlarged view of section II showing the upper assist handle of FIG. 1 in a first stowed position, according to a first embodiment.
Figure 3:
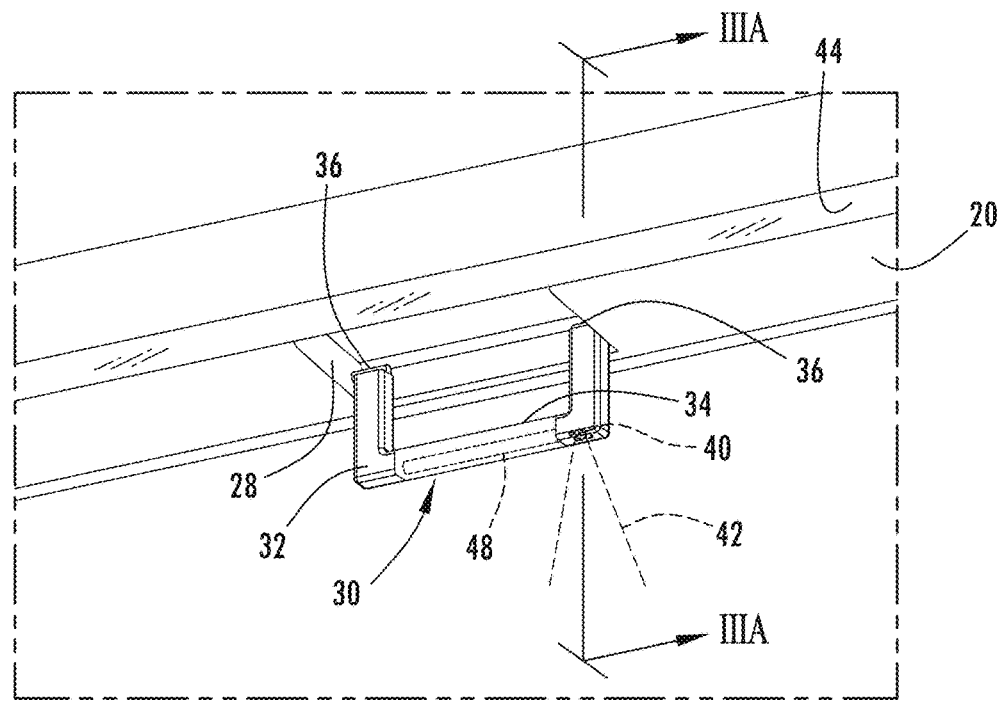
FIG. 3 is an enlarged view of the assist handle shown in FIG. 2 in a second deployed position.

Referring to FIGS. 1-3, a wheeled automotive or motor vehicle 10 is generally illustrated having a cabin interior 22 defined by a vehicle body 12 and configured with passenger seating which typically includes a front row of seats including a front row and a rear row of seats for transporting passengers in the vehicle 10. The cabin interior 22 is generally defined by the vehicle body 12 which may include one or more doors including front door 14 and rear door 16 and a roof 18 on the top side. The arrangement of seats may include a driver seat forward of a steering wheel and a passenger seats both on opposite lateral sides in the front row, and one or more rear seats 24 defining a second row. Each of the rows of seats are generally aligned with a corresponding door 14 or 16 on each side to allow ingress and egress to the vehicle cabin interior 22. The rear seat 24 is shown aligned with the rear door 16 which, when in the open position, exposes a door opening 21 to allow passengers to access the rear seat. The roof 18 includes a headliner 20 generally disposed on the bottom surface thereof and supported by the roof 18.

The motor vehicle 10 includes one or more deployable assist handles. In the example shown in FIG. 1, the motor vehicle 10 includes an upper assist handle 30 located proximate to the rear seat 24 and shown mounted to the headliner 20 attached to the roof 18 at a location proximate to an upper side of opening 21 of door 16 and a lower assist handle 130 located vehicle forward of the door opening 21 in the B-pillar 26. As such, each assist handle 30 and 130 is positioned to enable a user, such as a passenger, to engage and grip the assist handle 30 or 130 with a hand for support while entering the vehicle 10, exiting the vehicle 10, or for support while traveling in the vehicle 10. For example, a passenger may grip the assist handle 30 or 130 for ease in entering the vehicle 10. According to another example, the passenger may grip the assist handle 30 or 130 for ease in exiting the vehicle 10. According to a further example, a user, such as a passenger, may grip the assist handle 30 or 130 while traveling in the vehicle 10, such as traveling on rough terrain, for purposes of maintaining balance and stability. While the assist handles 30 and 130 are shown located on the headliner 20 on the roof 18 and B-pillar 26, respectively, it should be appreciated that the assist handle 30 or 130 may be located elsewhere on the vehicle 10, preferably proximate to an opening of a door and supported by a support structure.

The vehicle 10 is shown having a sliding door 16 that slides in a track between open and closed positions, according to one example. The door 16 may be operatively coupled to a sensor 25, such as a capacitive sensor, to sense the open position of the door 16. It should be appreciated that door configurations and sensor arrangements may be provided, according to other examples.

Figure 2A:
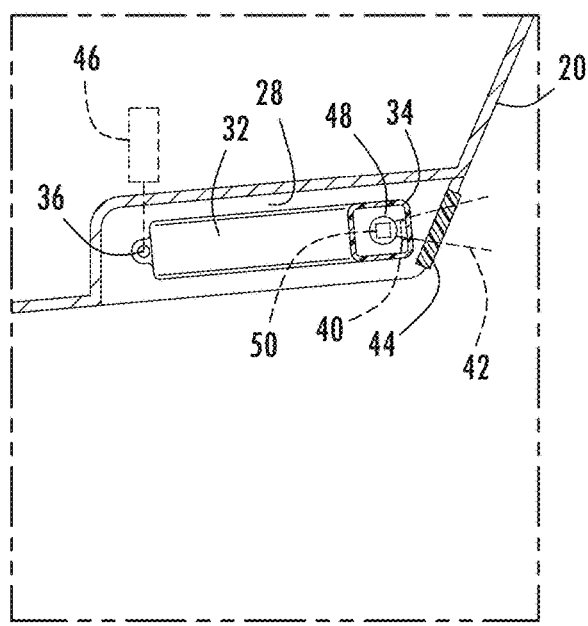
FIG. 2A is a cross-sectional view showing the upper assist handle taken through line IIA-IIA of FIG. 2.
Figure 3A:
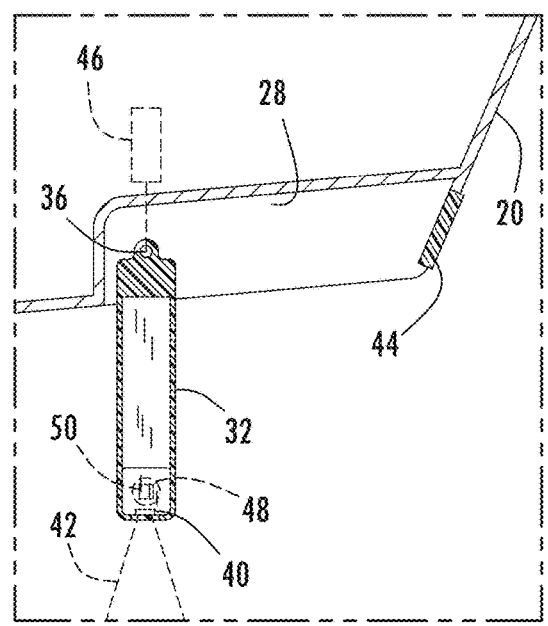
FIG. 3A is a cross-sectional view showing the upper assist handle taken through line IIIA-IIIA of FIG. 3.

The upper assist handle 30 is illustrated in FIGS. 2-3A, according to a first embodiment. The upper assist handle 30 is generally shown supported on a support structure of the vehicle 10 such as the headliner 20 on the roof 18. The assist handle 30 has a handle body 32 generally disposed within a recess 28 within the headliner 20 and positioned above the door opening 21. The handle body 32 has a generally U-shaped configuration and is pivotally attached to the support structure at pivot pins 36 on opposite lateral sides which enable the handle body 32 to rotate between an approximately horizontal stowed positon shown in FIGS. 2 and 2A and a downward deployed use position shown in FIGS. 3 and 3A. As such, the handle body 32 rotates approximately 90° between the stowed and deployed positions. In one embodiment, the assist handle 30 includes an actuator such as an electric motor 46 for actuating the handle body 32 between the deployed and use positions to rotate the handle body 32 about the pivot pins 36. It should be appreciated that the assist handle may otherwise be deployed such as manually or with spring assist devices, or via a mechanical linkage in the door 16 that actuates the handle body 32 based on movement of the door between the stowed and deployed positions, according to other embodiments.

The assist handle 30 further includes a lighting device 40 having a light source, such as one or more light-emitting diodes (LEDs) located on one side of the handle body 32 at a location such as a corner location which generally is not covered by a user's hand when gripping a gripping portion 34 of the handle body 32. The lighting device 40 generates an illumination beam of light 42 that can be directed in a first direction to illuminate a first region. A lens 44 may be disposed within the recess 28 in headliner 20 in a position such that when the assist handle 30 is in the approximately horizontal stowed position as seen in FIGS. 2 and 2A, the light illumination beam 42 is projected in the first direction through lens 44 to provide an overhead ambient light within the first region in the cabin interior 22 below the headliner 20. When the assist handle 30 is rotated downward to the deployed use position as seen in FIGS. 3 and 3A, the light beam 42 projects downward at a higher light intensity in a second direction to illuminate a lower second region including at least one or more of the exterior of the vehicle 10 and the interior of the vehicle 10. As such, the illumination beam in the second region may provide a puddle lamp on the ground outside the vehicle when the door 16 is on the open position or a footwell lamp inside the vehicle and both. This may include illuminating the floor and/or the rocker panel along the bottom edge of the door opening 21. Accordingly, the assist handle 30 may provide a low light intensity ambient overhead light or a higher intensity puddle lamp or footwell lamp, depending on the position of the handle body 32.

The handle body 32 may further include a light pipe 48 integrally formed on the gripping portion 34 to visibly illuminate the handle body 32. The light pipe 48 may receive light from the light source of the lighting device 40 and emit the light through a light permeable material on the handle body 32.

Figure 4:
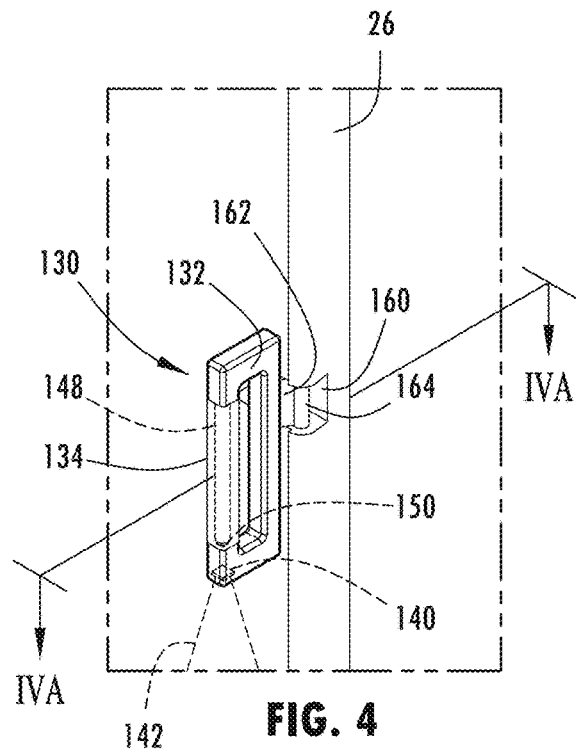
FIG. 4 is an enlarged view of section IV showing the lower assist handle mounted to the pillar and in a first position, according to a second embodiment.
Figure 5:
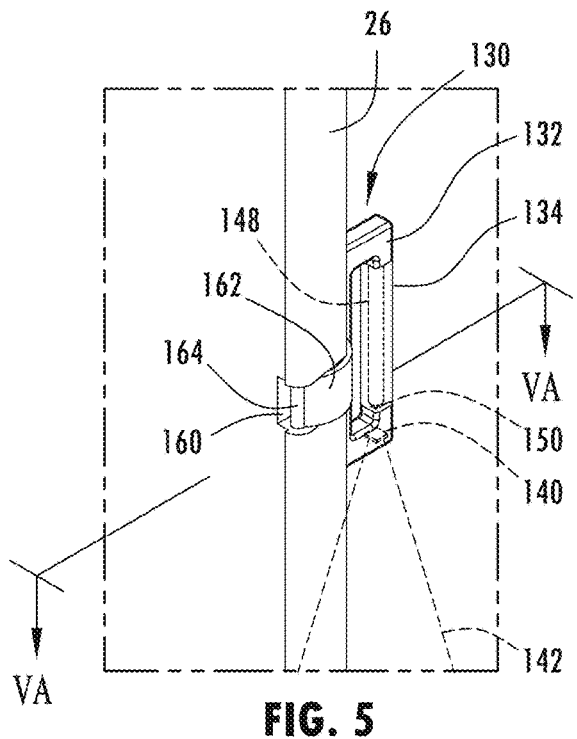
FIG. 5 is a perspective view of the lower assist handle shown in FIG. 4 in a second position.
Figure 4A:
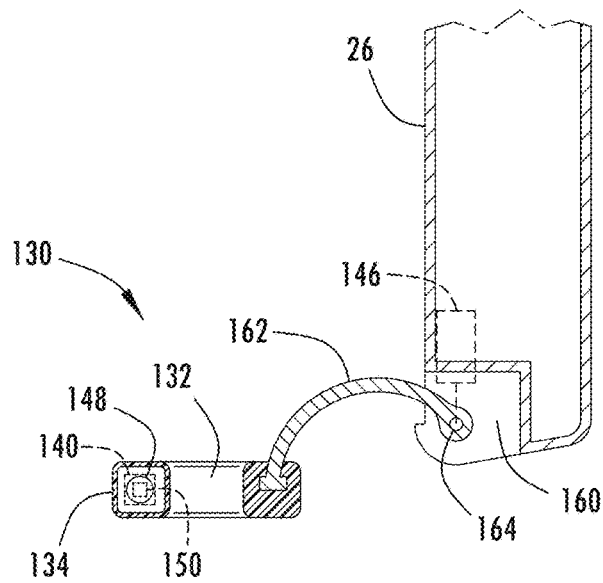
FIG. 4A is a cross-sectional view showing the lower assist handle taken through line IVA-IVA of FIG. 4.
Figure 5A:
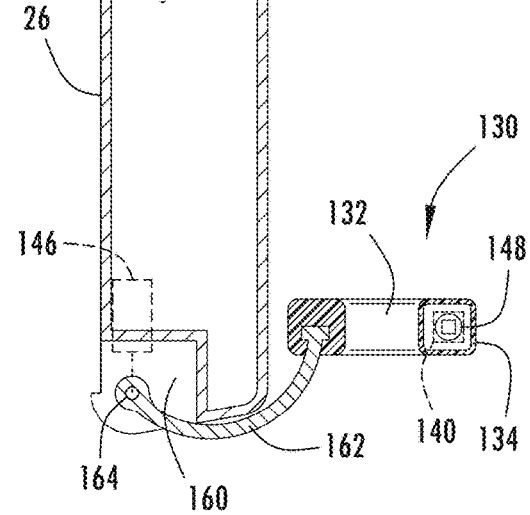
FIG. 5A is a cross-sectional view showing the lower assist handle taken through line VA-VA of FIG. 5.
Figure 6:
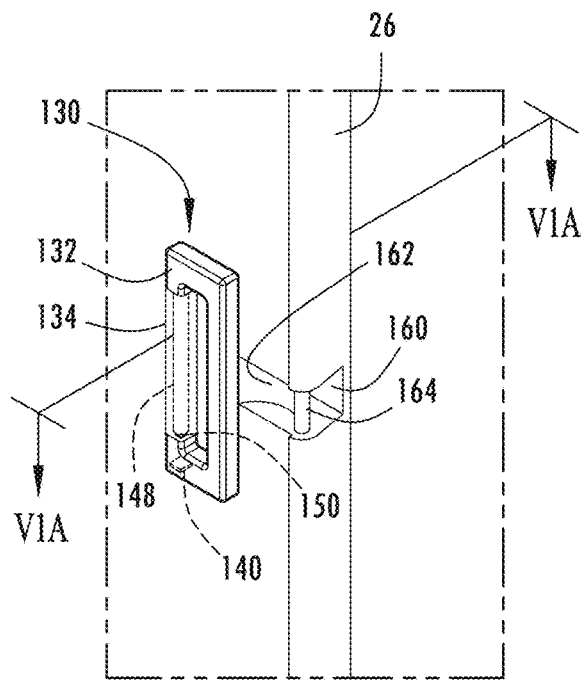
FIG. 6 is an enlarged perspective view of an assist handle coupled to a pillar shown in a first position, according to a third embodiment.

Referring to FIGS. 4-5A, the lower assist handle 130 is shown as an assist handle according to a second embodiment and is deployable between first and second positions. As seen in FIGS. 4 and 4A, the assist handle 130 has a handle body 132 connected to an actuator C-shaped arm 162 which pivots about a pivot pin 164 that is located within a recess 160 in the B-pillar 26. The handle body 132 generally forms a rectangular closed loop, but may have other shapes and sizes. The handle body 132 is movable between the first position shown in FIGS. 4 and 4A which extends into the cabin interior 22 of the vehicle 10 and a second position extending outside of the vehicle 10 as seen in FIGS. 5 and 5A as pivot arm 162 rotates by an angle of approximately 180°. It should be appreciated that the pivot arm 162 may be rotated about the pivot pin 164 with the use of an actuator, such as an electric motor 146, according to one embodiment.

The assist handle 130 includes a lighting device 140, having a light source such as one or more LEDs located on a bottom portion of the handle body 132 to generate a light beam 142 projected downward. When the assist handle 130 is in the first position within the cabin interior 22 of the vehicle 10 as shown in FIGS. 4 and 4A, the light source 140 projects the light illumination beam 142 downward directed to a first region to provide lighting for a footwell area in the interior of the vehicle 10. When the handle body 132 is rotated to the second position extending outside of the vehicle 10 as shown in FIGS. 5 and 5A, the light source 140 projects the light beam 142 downward directed to a second region to provide a puddle lamp outside of the vehicle 10. In addition, the handle body 132 may include a light pipe 148 in the gripping portion 134 to receive light from the light source 140 and visibly illuminate the handle body 132.

Figure 6A:
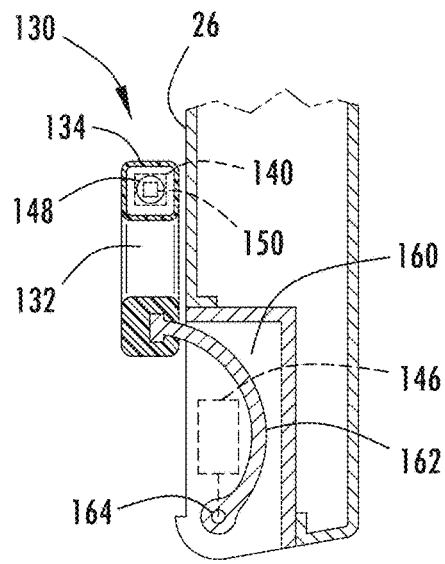
FIG. 6A is a cross-sectional view of the assist handle taken through line VIA-VIA of FIG. 6.

Referring to FIGS. 6-9A, an assist handle 130 is illustrated having four positions of the handle body 132 that rotates about 270°, according to a third embodiment. The assist handle 130 has a handle body 132 and a lighting device 140 similar to that described in connection with the assist handle of the second embodiment. However, the assist handle body 132 is the third embodiment is connected to the B-pillar of the vehicle 10 forward of the door opening 21 via the arcuate C-shaped arm 162 and pivots to move amongst four separate positions. In addition, the recess 160 is enlarged to allow greater rotation of the arm 162 and handle body 132. The handle body 132 is shown in a first position in FIGS. 6 and 6A in which the handle body 132 is stowed against a sidewall of the B-pillar 26. In this position, the lighting device 140 may be turned off.

Figure 7:
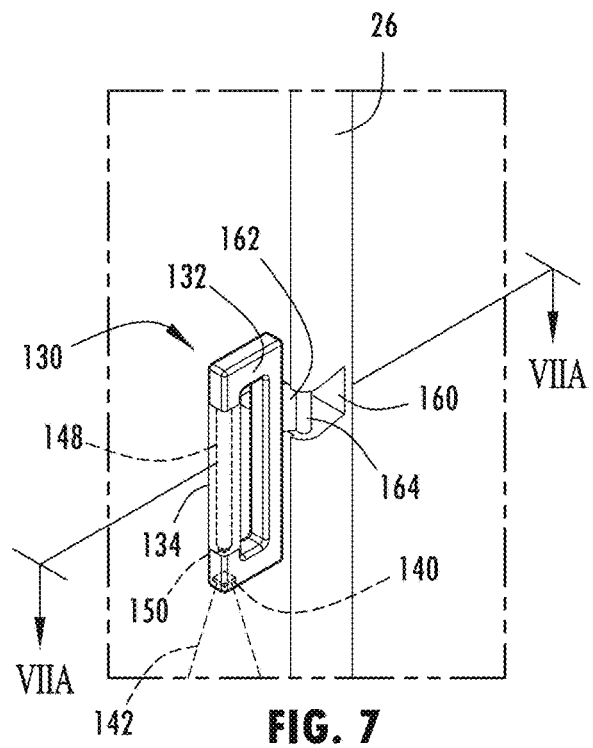
FIG. 7 is a perspective view of the assist handle shown in FIG. 6 with the handle in a second position.
Figure 7A:
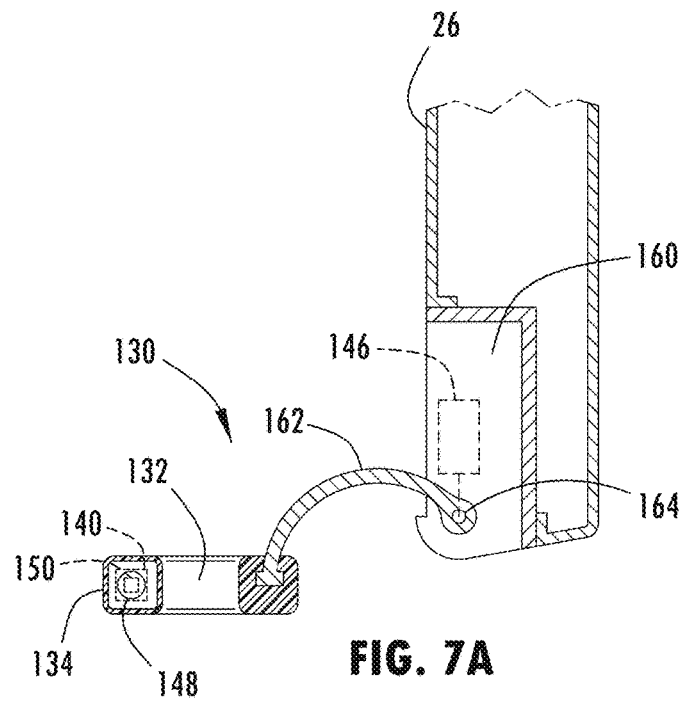
FIG. 7A is a cross-sectional view of the assist handle taken through line VIIA-VIIA of FIG. 7.

Referring to FIGS. 7 and 7A, the handle body 132 is rotated approximately 90° to a second position extending into the cabin interior 22. In the second positon, the lighting device 140 with light source 150 may be turned on to provide a beam of light 142 directed to a first region within the interior of the vehicle 10 such as in the footwell area to provide footwell lighting.

Figure 8:
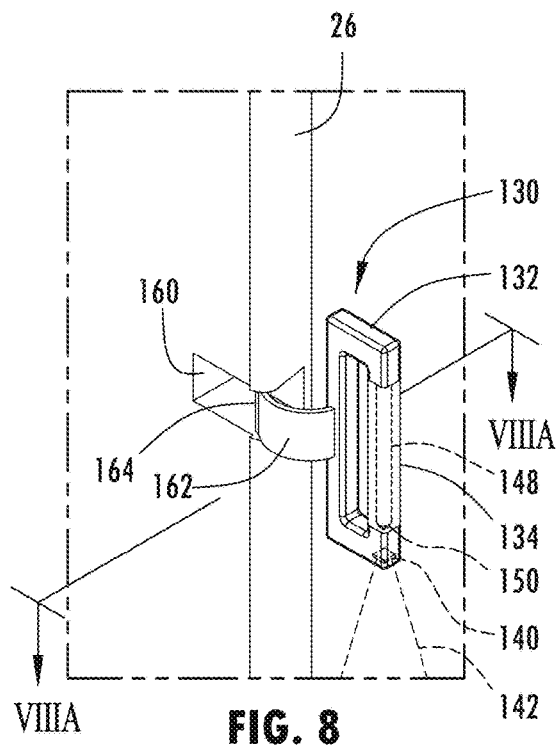
FIG. 8 is a perspective view of the assist handle shown in FIG. 6 in a third position.
Figure 8A:
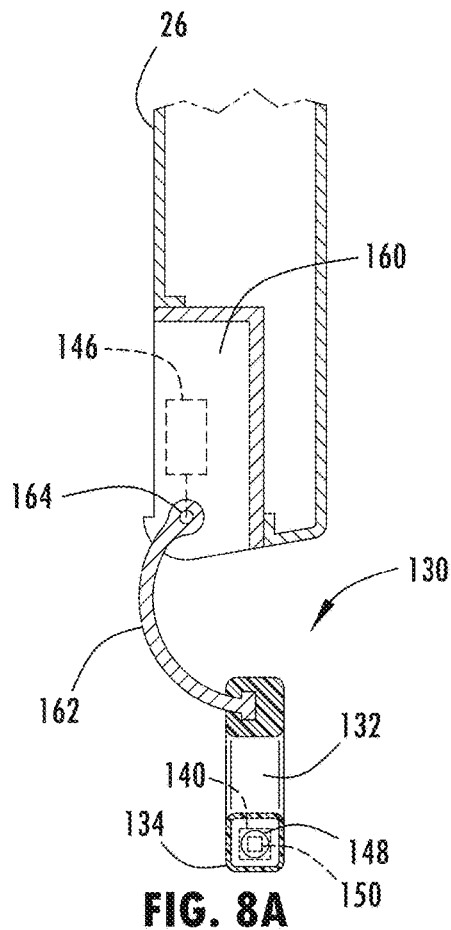
FIG. 8A is a cross-sectional view of the assist handle taken through line VIIIA-VIIIA of FIG. 8.

Referring to FIGS. 8 and 8A, the handle body 132 is rotated another 90° counterclockwise or 180° relative to the stowed first position to a third positon generally located within the door opening 21 of the door 16 when the door 16 is in the open position. In this position, the lighting device 140 may be activated to direct the illumination beam 142 to a second region to illuminate the bottom region of the door opening 21 such as the rocker panel.

Figure 9:
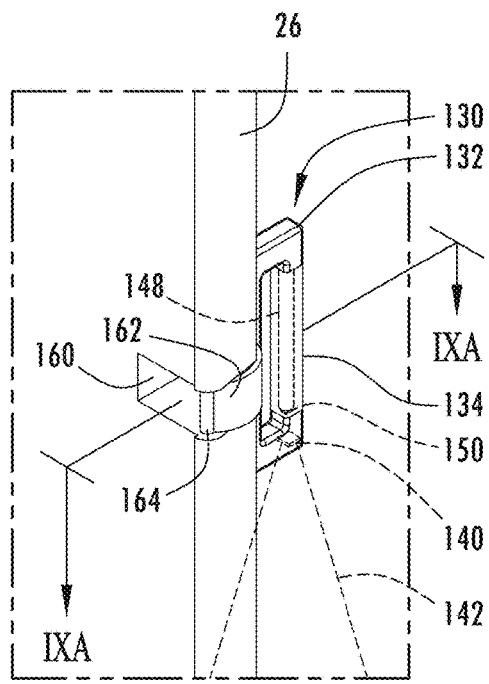
FIG. 9 is a perspective view of the assist handle shown in FIG. 6 is a fourth positon.
Figure 9A:
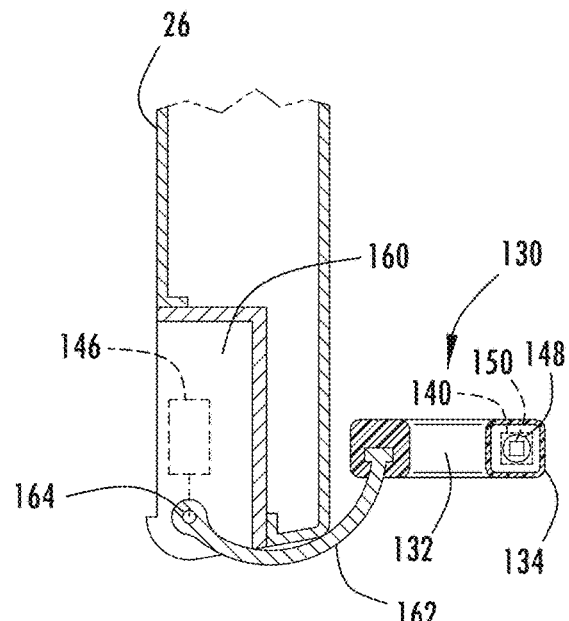
FIG. 9A is a cross-sectional view of the assist handle taken through line IXA-IXA of FIG. 9.

Referring to FIGS. 9 and 9A, the assist handle 130 is shown further rotated another 90° or 270° relative to the stowed first position such that the handle body 132 extends outside of the vehicle 10. In the fourth position, the lighting device 140 may generate a light beam 142 directed downward to illuminate a third region to provide a puddle lamp outside of the vehicle 10.

Figure 10:
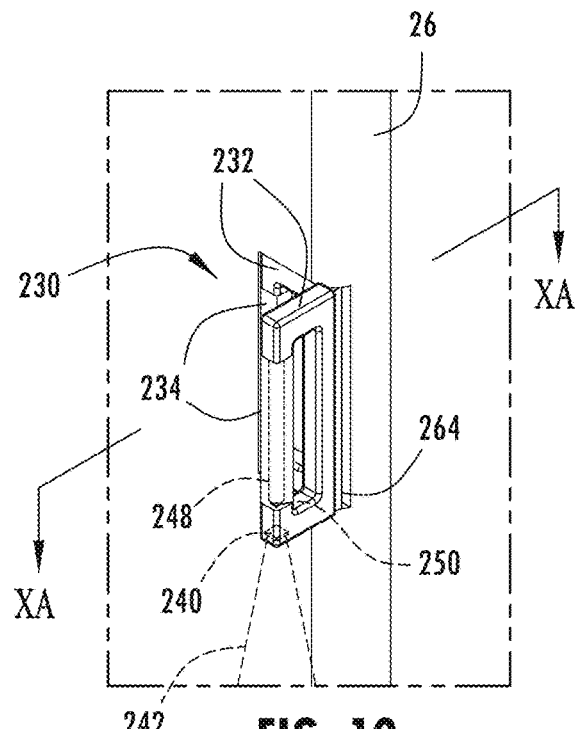
FIG. 10 is a perspective view of an assist handle having two handle bodies, according to a fourth embodiment and shown with the handle bodies in a first position.
Figure 11:
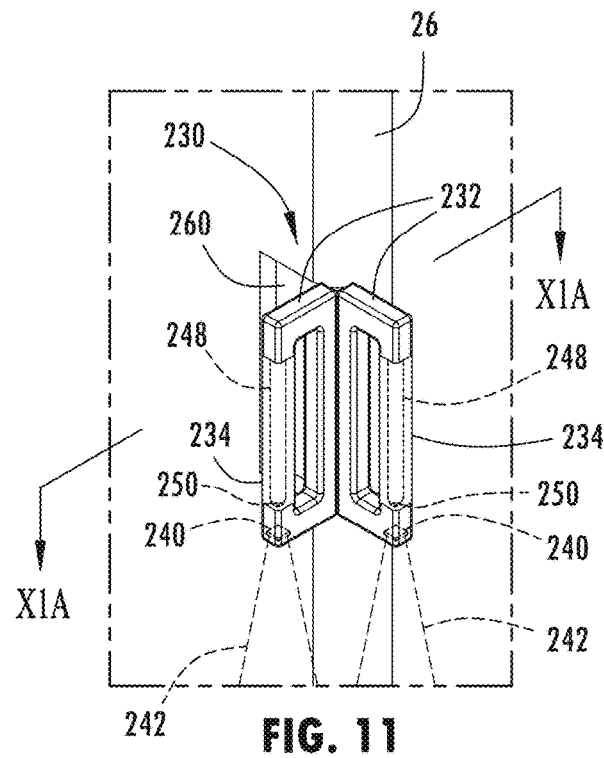
FIG. 11 is a perspective view of the assist handle shown in FIG. 10 with the handle bodies in a second position.
Figure 10A:
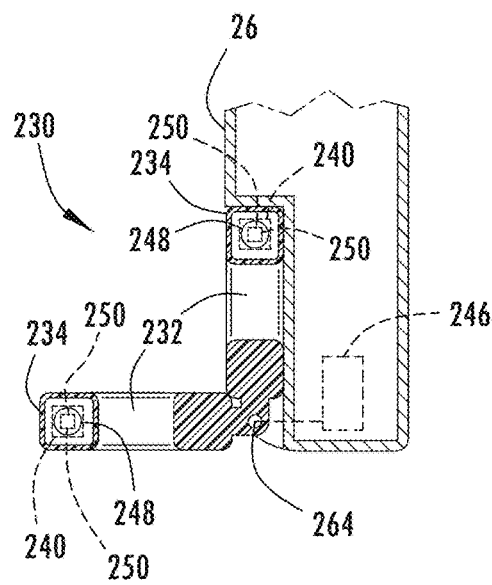
FIG. 10A is a cross-sectional view of the assist handle taken through line XA-XA of FIG. 10.
Figure 11A:
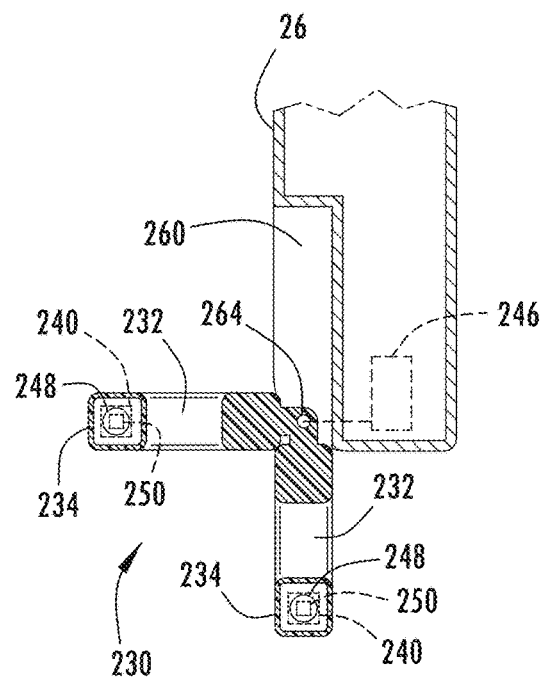
FIG. 11A is a cross-sectional view of the assist handle taken through line XIA-XIA of FIG. 11.

Referring to FIGS. 10-11A, an assist handle 230 is shown according to a fourth embodiment having first and second handle bodies 232. In this embodiment, the first handle body 232 may be in a stowed position while the second handle body 232 is positioned 90° inwards into the cabin interior 22 as seen in FIGS. 10 and 10A. It should be appreciated that a lighting device 240 on the bottom corner of the second handle body 232 may provide an illumination beam 242 of light directed downward to illuminate a first region for vehicle interior lighting. The first and second handle bodies 232 may be rotated about pivot pins 264 outward by an angle of about 90° by an actuator, such as an electric motor 246 such that the first handle body 232 extends into the vehicle interior and the second handle body 232 extends within the door opening 21 of the door 16 when the door 16 is in the open position. In this position, either or both of the handle bodies 232 may have lighting devices 240 with light sources 250 that are able to illuminate first and second regions of the cabin interior 22 of the vehicle 10 and the bottom door opening 21 of the vehicle 10 with illumination beams 242. The gripping portion 234 of each handle body 232 may also have a light pipe 248. It should further be appreciated that the first and second handle bodies 232 may be further rotated another 90° and to other positions.

It should be appreciated the deployable assist handle 30, 130 and 230 may otherwise be configured to provide a plurality of adjustable use positions, according to other embodiments. It should further be appreciated that the deployable assist handle 30, 130 and 230 may illuminate other regions inside and outside of the vehicle 10.

Accordingly, the vehicle 10 advantageously provides for a deployable assist handle 30, 130 and 230 that deploys to one of a plurality of positions and illuminates different regions in the various positions. This advantageously allows for enhanced use of the assist handle 30, 130 and 230 to allow a user to enter or exit the vehicle 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
   a body defining a door opening;
   a door movable between a closed position closing the door opening d an open position exposing the door opening;
   a support structure located proximate to the door opening; and
   a deployable assist handle having a handle body configured to be gripped by a user, the handle body being deployable amongst a plurality of positions including at least a first position which is engageable by a user and a second position which is engageable by the user, the assist handle comprising a lighting device, wherein the lighting device provides an illumination beam directed to a first region when the handle body is in the first position and directed to a second region when the handle body is in the second position, wherein the handle body in the first position is located within an interior of the vehicle and the illumination beam in the first region provides an interior light, and wherein the handle body is movable to the second position proximate to an exterior of the vehicle and the illumination beam in the second region direction provides an exterior light.

2. The vehicle of claim 1, wherein the assist handle is located proximate to a roof of the vehicle proximate to the door opening.

3. The vehicle of claim 2, wherein the assist handle is located in a headliner coupled to the roof.

4. The vehicle of claim 3, wherein the illumination beam projects light to the first region proximate to the headliner.

5. The vehicle of claim 4, wherein the illumination beam projects light downward to the second region.

6. The vehicle of claim 1, wherein the assist handle is located in a pillar proximate to the door opening.

7. The vehicle of claim 1, wherein the assist handle further comprises an actuator for actuating the handle between the first position and the second position.

8. The vehicle of claim 7, wherein the vehicle further comprises a sensor for sensing the door positioned in the open position or closed position, wherein the handle is actuated to a use position when the door is sensed in the open position.

9. The vehicle of claim 1, wherein the handle body is coupled to the support structure via a support arm that rotates.

10. The vehicle of claim 1, wherein the handle body is at least partially illuminated.

11. The vehicle of claim 10, wherein the handle body comprises a light pipe operatively coupled to the lighting device.

12. The vehicle of claim 1, wherein the handle body is coupled to the support structure via a support arm that rotates.

13. A vehicle comprising:
   a body defining a door opening;
   a door movable between a closed position closing the door opening in an open position exposing the door opening;
   a support structure located in a pillar or headliner proximate to the door opening; and
   a deployable assist handle having a handle body that rotates relative to the support structure and is configured to be gripped by a user, the handle body being deployable amongst a plurality of positions including at least a first position which is engageable by a user and a second position which is engageable by the user, the assist handle comprising a lighting device, wherein the lighting device provides an illumination beam directed to a first region when the handle is in the first position and to a second region when the handle is in the second position, wherein the handle body in the first position is located within an interior of the vehicle and the illumination beam in the first region provides an interior light, and wherein the handle body is movable to the second position proximate to an exterior of the vehicle and the illumination beam in the second region direction provides an exterior light.

14. The vehicle of claim 13, wherein the assist handle further comprises an actuator for actuating the handle between the first position and second position.

15. The vehicle of claim 14, wherein the vehicle further comprises a sensor for sensing the door positioned in the open position or closed position, wherein the handle is actuated when the door is sensed in the open position.

16. The vehicle of claim 13, wherein the handle body is coupled to the support structure via a support arm that rotates.

17. The vehicle of claim 13, wherein the handle body is at least partially illuminated.

18. The vehicle of claim 17, wherein the handle body comprises a light pipe operatively coupled to the lighting device.

* * * * *

UNITED STATES PATENT AND TRADEMARK OFFICE
CERTIFICATE OF CORRECTION

| | |
|---|---|
| PATENT NO. | : 11,780,356 B1 |
| APPLICATION NO. | : 17/854558 |
| DATED | : October 10, 2023 |
| INVENTOR(S) | : Salter et al. |

It is certified that error appears in the above-identified patent and that said Letters Patent is hereby corrected as shown below:

In the Claims

Column 8:
Claim 1, Line 28;
"d" should be --and--.

Signed and Sealed this
Twelfth Day of December, 2023

*Katherine Kelly Vidal*

Katherine Kelly Vidal
*Director of the United States Patent and Trademark Office*